US007051287B1

(12) United States Patent
Tsunoda

(10) Patent No.: US 7,051,287 B1
(45) Date of Patent: May 23, 2006

(54) DISPLAY DEVICE WITH FRAME REDUCTION, DISPLAY CONTROL METHOD THEREOF, AND STORAGE MEDIUM

(75) Inventor: Takashi Tsunoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/459,644

(22) Filed: Dec. 13, 1999

(30) Foreign Application Priority Data

Dec. 14, 1998 (JP) ................................ 10-375059
Oct. 21, 1999 (JP) ................................ 11-299705

(51) Int. Cl.
*G06F 9/00* (2006.01)
*G09G 5/00* (2006.01)

(52) U.S. Cl. ........................................ 715/778; 345/1.3

(58) Field of Classification Search ................ 345/343, 345/344, 345, 346, 113, 114, 589, 776, 781, 345/1.1, 1.2, 1.3; 715/776, 781
See application file for complete search history.

(56) References Cited

U.S. PATENT DOCUMENTS 5,327,235 A * 7/1994 Richards ..................... 348/180
5,392,396 A * 2/1995 MacInnis .................... 345/501
5,499,327 A * 3/1996 Satoh ......................... 345/634
5,651,107 A * 7/1997 Frank et al. ................ 395/344
5,675,753 A * 10/1997 Hansen et al. .............. 395/333
5,889,517 A * 3/1999 Ueda et al. ................. 345/803
5,912,713 A 6/1999 Tsunoda et al. ............ 348/540
5,945,983 A 8/1999 Kanno et al. ............... 345/204
5,968,132 A * 10/1999 Tokunaga et al. ........... 709/224
5,973,665 A * 10/1999 Davie et al. ................ 345/141
6,025,841 A * 2/2000 Finkelstein et al. ......... 345/342
6,037,921 A 3/2000 Matsumoto et al. .......... 345/88
6,137,490 A * 10/2000 Shishido ..................... 345/343
6,252,595 B1 * 6/2001 Birmingham et al. ....... 345/343
6,326,985 B1 * 12/2001 Tazoe et al. ................ 345/764
6,336,052 B1 * 1/2002 Ouellet et al. ................ 700/83
6,351,270 B1 * 2/2002 Nishikawa et al. ......... 345/717
6,363,204 B1 * 3/2002 Johnson et al. ............... 386/46

* cited by examiner

*Primary Examiner*—Ryan Yang
(74) *Attorney, Agent, or Firm*—Fitzpatrick, Cella, Harper & Scinto

(57) ABSTRACT

Four windows A, B, C, and D are displayed on the display screen. Of the four windows displayed on the display screen, an active window which is currently being accessed is A, and other windows, i.e., windows B, C, and D, are inactive windows. The inactive windows are displayed at a lower luminance than the active window.

12 Claims, 12 Drawing Sheets

DISPLAY DEVICE WITH FRAME REDUCTION, DISPLAY CONTROL METHOD THEREOF, AND STORAGE MEDIUM

BACKGROUND OF THE INVENTION

The present invention relates to a display device and its display control method, and a storage medium and, more particularly, to a display device having display means capable of displaying a plurality of windows on a display screen, its display control method, and a storage medium.

Conventionally, in a computer which is used by connecting a display device or has a built-in display device, an OS having a multi-window function capable of displaying a plurality of windows on a single large and high-definition display screen is used. When a plurality of windows are displayed on a single display screen, a cursor that moves on the display screen in accordance with operation of a pointing device such as a mouse or the like is moved onto a desired window to set that window active (i.e., to indicate the window accessed), and a data process on the window which is active (to be referred to as an active window hereinafter) is made.

However, when a plurality of windows are opened in turn, it gradually becomes hard for the user to tell which window is currently active. In order to confirm in practice whether or not the window of interest is active, the user must intentionally move the cursor to that, and then click a button provided to the pointing device at that position, resulting in troublesome operation.

When a plurality of windows are simultaneously opened, and moving images are displayed on all these windows, the user may fail to determine which window he or she should look at. Even if this does not happen, if there is a window with quicker motion than the moving image of interest, user's attention may be attracted to that window, and he or she may fail to focus on the window of his or her choice.

SUMMARY OF THE INVENTION

The present invention has been made in consideration of the aforementioned problems, and has as its object to provide a display device which can clearly indicate the window which is currently active even when a plurality of windows are opened, its display control method, and a storage medium.

In order to achieve the above object, a display device according to the present invention comprises the following arrangement.

That is, there is provided a display device capable of displaying a plurality of windows on a display screen, comprising:

discrimination means for discriminating if image data to be displayed on each of the plurality of windows is image data to be displayed on an active window; and display control means for controlling display of image data to be displayed on each of the plurality of windows on the basis of a discrimination result of the discrimination means.

In order to achieve the above object, a display control method for a display device according to the present invention comprises the following arrangement.

That is, there is provided a display control method for a display device capable of displaying a plurality of windows on a display screen, comprising:

the discrimination step of discriminating if image data to be displayed on each of the plurality of windows is image data to be displayed on an active window; and the display control step of controlling display of image data to be displayed on each of the plurality of windows on the basis of a discrimination result in the discrimination step.

In order to achieve the above object, a storage medium according to the present invention comprises the following arrangement.

That is, there is provided a storage medium which stores a program that pertains to display control in a format readable by a computer which is connected to or incorporates a display device capable of displaying a plurality of windows on a display screen, the program comprising:

the discrimination step of discriminating if image data to be displayed on each of the plurality of windows is image data to be displayed on an active window; and the display control step of controlling display of image data to be displayed on each of the plurality of windows on the basis of a discrimination result in the discrimination step.

In order to achieve the above object, a display device according to the present invention comprises the following arrangement.

That is, there is provided a display device capable of displaying a plurality of windows on a display screen, comprising:

input means for inputting display data;

first storage means for storing the input display data;

second storage means for storing the display data output from the first storage means;

display means for displaying the display data stored in the second storage means at a predetermined luminance;

detection means for detecting position information on the display means where the display data is to be displayed;

discrimination means for discriminating based on the detected position information if the display data is active; and luminance control means for lowering the luminance of the display data when the discrimination means determines that the display data is not active.

In order to achieve the above object, a display device according to the present invention comprises the following arrangement.

That is, there is provided a display device capable of displaying a plurality of windows on a display screen, comprising:

input means for inputting display data;

first storage means for storing the input display data;

second storage means for storing the display data output from the first storage means;

display means for displaying the display data stored in the second storage means at a predetermined luminance;

detection means for detecting position information on the display means where the display data is to be displayed;

discrimination means for discriminating based on the detected position information if the display data is active; and luminance inversion means for inverting the luminance of the display data when the discrimination means determines that the display data is not active.

In order to achieve the above object, a display control method for a display device according to the present invention comprises the following arrangement.

That is, there is provided a display control method for a display device capable of displaying a plurality of windows on a display screen, comprising:

the input step of inputting display data;

the first storage step of storing the input display data in first storage means;

the second storage step of storing the display data output from the first storage means in second storage means;

the display step of displaying on display means the display data stored in the second storage means at a predetermined luminance;

the detection step of detecting position information on the display means where the display data is to be displayed; and the discrimination step of discriminating based on the detected position information if the display data is active, wherein the luminance of the display data is lowered when it is determined that the display data is not active.

In order to achieve the above object, a display control method for a display device according to the present invention comprises the following arrangement.

That is, there is provided a display control method for a display device capable of displaying a plurality of windows on a display screen, comprising:

the input step of inputting display data;

the first storage step of storing the input display data in first storage means;

the second storage step of storing the display data output from the first storage means in second storage means;

the display step of displaying on display means the display data stored in the second storage means at a predetermined luminance;

the detection step of detecting position information on the display means where the display data is to be displayed; and the discrimination step of discriminating based on the detected position information if the display data is active, wherein the luminance of the display data is inverted when it is determined that the display data is not active.

In order to achieve the above object, a storage medium according to the present invention comprises the following arrangement.

That is, there is provided a storage medium which stores a program that pertains to display control in a format readable by a computer which is connected to or incorporates a display device capable of displaying a plurality of windows on a display screen, the program comprising:

the input step of inputting display data;

the first storage step of storing the input display data in first storage means;

the second storage step of storing the display data output from the first storage means in second storage means;

the display step of displaying on display means the display data stored in the second storage means at a predetermined luminance;

the detection step of detecting position information on the display means where the display data is to be displayed; and the discrimination step of discriminating based on the detected position information if the display data is active, wherein the luminance of the display data is lowered when it is determined that the display data is not active.

In order to achieve the above object, a display device according to the present invention comprises the following arrangement.

That is, there is provided a storage medium which stores a program that pertains to display control in a format readable by a computer which is connected to or incorporates a display device capable of displaying a plurality of windows on a display screen, the program comprising:

the input step of inputting display data;

the first storage step of storing the input display data in first storage means;

the second storage step of storing the display data output from the first storage means in second storage means;

the display step of displaying on display means the display data stored in the second storage means at a predetermined luminance;

the detection step of detecting position information on the display means where the display data is to be displayed; and the discrimination step of discriminating based on the detected position information if the display data is active, wherein the luminance of the display data is inverted when it is determined that the display data is not active.

In order to achieve the above object, a display device according to the present invention comprises the following arrangement.

That is, there is provided a display device capable of displaying a plurality of windows on a display screen, comprising:

connection means for connecting a plurality of types of input devices;

discrimination means for discriminating if image data input from each of the input devices connected to the connection means is image data to be displayed in an active window;

input control means for controlling an input timing of image data input from each of the input devices connected to the connection means on the basis of a discrimination result of the discrimination means;

image processing means for performing an image process of image data input from the input control means; and display means for displaying image data that has undergone the image process in the image processing means.

In order to achieve the above object, a display control method for a display device according to the present invention comprises the following arrangement.

That is, there is provided a display control method for a display device capable of displaying a plurality of windows on a display screen, comprising:

the discrimination step of discriminating if image data input from each of a plurality of types of input devices is image data to be displayed in an active window;

the input control step of controlling an input timing of image data input from each of the input devices on the basis of a discrimination result in the discrimination step;

the image processing step of performing an image process of image data input from the input control step; and the display step of displaying image data that has undergone the image process in the image processing step.

In order to achieve the above object, a storage medium according to the present invention comprises the following arrangement.

That is, there is provided a storage medium which stores a program that pertains to display control in a format readable by a computer which is connected to or incorporates a display device capable of displaying a plurality of windows on a display screen, the program comprising:

the discrimination step of discriminating if image data input from each of a plurality of types of input devices is image data to be displayed in an active window;

the input control step of controlling an input timing of image data input from each of the input devices on the basis of a discrimination result in the discrimination step;

the image processing step of performing an image process of image data input from the input control step; and the display step of displaying image data that has undergone the image process in the image processing step.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will be described hereinafter with reference to the accompanying drawings.

First Embodiment

The first embodiment of the present invention will be described below with reference to FIGS. 1 to 4.

Figure 1:
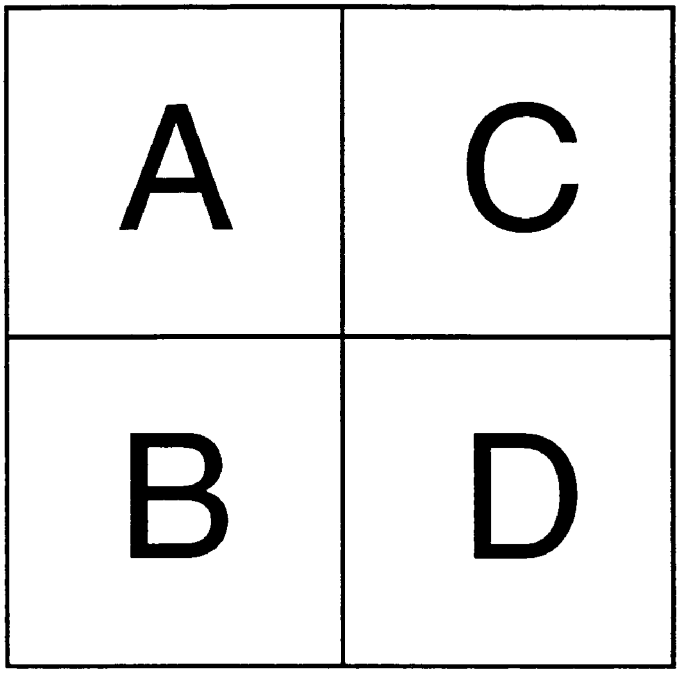
FIG. 1 is an explanatory view showing the display state on the display screen of a conventional display device.

FIG. 1 is an explanatory view showing the display state on the display screen of a conventional display device. Referring to FIG. 1, four windows A, B, C, and D are displayed on the display screen. Windows A, B, C, and D have the same window size. As shown in FIG. 1, since windows A, B, C, and D are displayed at an identical luminance on the conventional display device, it is hard to visually confirm the window which is currently active.

Figure 2:
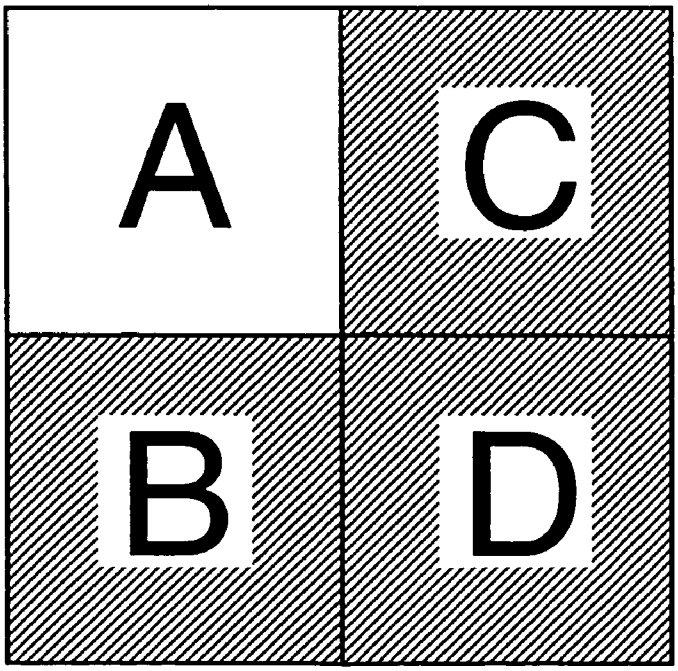
FIG. 2 is an explanatory view showing the display state on the display screen of a display according to the first embodiment of the present invention.

FIG. 2 shows the display state on the display screen of a display of the first embodiment.

Referring to FIG. 2, four windows A, B, C, and D are displayed on the display screen, as in FIG. 1. Of the four windows displayed on the display screen, window A is active, and other windows, i.e., windows B, C, and D are inactive. In the first embodiment, image displayed in the inactive windows are displayed at a lower luminance than image displayed in the active window.

Figure 3:
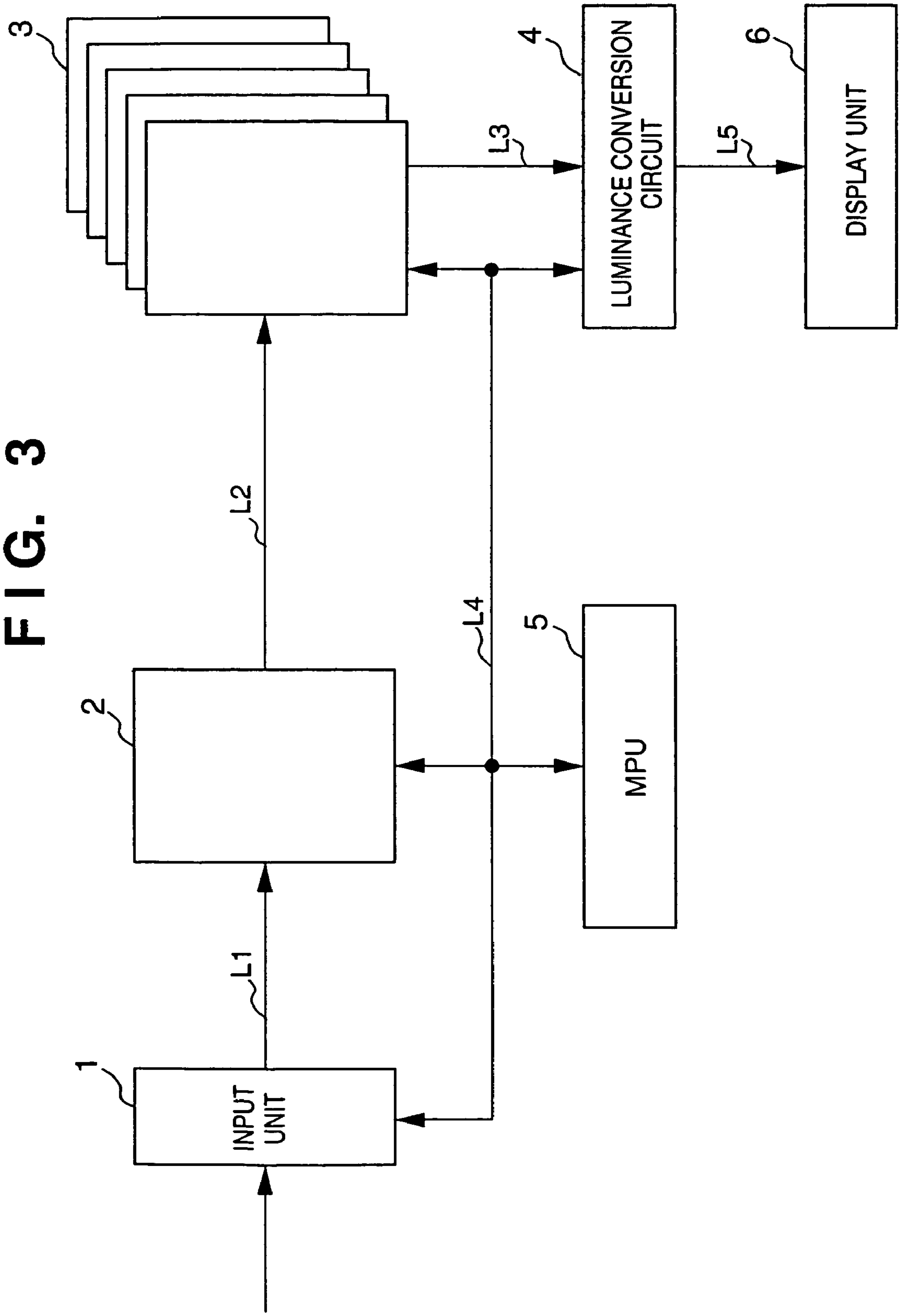
FIG. 3 is a block diagram showing the arrangement of an information processing system which can implement display control according to the first embodiment shown in FIG. 2.

FIG. 3 is a block diagram showing the arrangement of an information processing system which can implement display control according to the first embodiment shown in FIG. 2.

Referring to FIG. 3, an information processing system includes an input unit 1 for receiving display data and the like sent from a host computer (not shown), a first storage unit 2 for storing input display data in units of lines, a second storage unit 3 as a frame memory for storing in units of frames display data transferred from the first storage unit 2 in units of lines, a luminance conversion circuit 4 for controlling the luminance of display data, a central processing unit (MPU) 5 having a function of managing and controlling the entire information processing system, and a display 6 having a resolution of 3,200 dots×2,400 dots or more.

The input unit 1 converts, e.g., serial data input at high speed from the host computer or the like into parallel data.

Display data processed by the input unit 1 is sent to the first storage unit 2 via a signal line L1. The first storage unit 2 is a memory for storing display data processed by the input unit 1 in units of lines, as described above, and sequentially transfers display data to the second storage unit 3 via a signal line L2 under the control of a control signal sent from the MPU 5 via a control line L4. The display data stored in the second storage unit 3 is transferred to the luminance conversion circuit 4 via a signal line L3 under the control of a control signal sent from the MPU 5 via the control line L4.

The MPU 5 recognizes a window which is currently being accessed, and its window size and physical position. Hence, the MPU 5 checks based on the physical position information of the window if display data which is being currently processed by the luminance conversion circuit 4 is active. If the display data is inactive, the MPU 5 executes a process for lowering the luminance level. For example, when display data read out from the second storage unit 3 has a luminance level value=64, and corresponds to an inactive window, the luminance conversion circuit 4 controls the luminance level value of that display data to be 32. In this manner, the display data to be displayed on the display 6 is luminance-converted, and is displayed on the display 6 via a signal line L5.

Assume that the luminance level value of display data read out from the second storage unit 3 is pre-stored in, e.g., the second storage unit 3.

Figure 4:
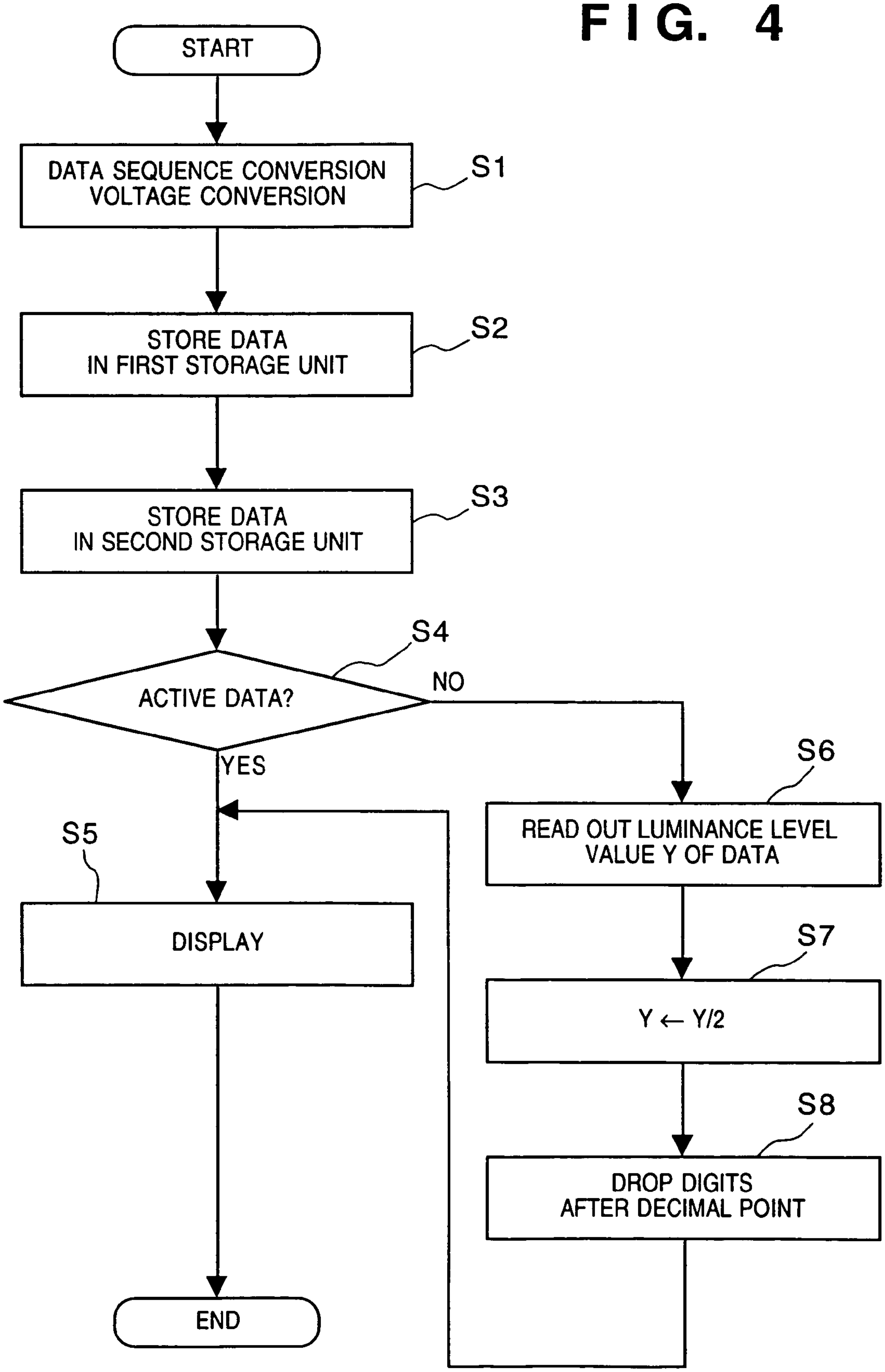
FIG. 4 is a flow chart showing a display control sequence executed in the first embodiment.

FIG. 4 is a flow chart showing the display control sequence executed in the first embodiment.

When display data is input to the input unit 1, the input unit 1 performs a data sequence conversion process of that display data, and also power supply voltage conversion (step S1). In this data sequence conversion process, display data input as RGB data from the input unit 1 is serial-to-parallel converted into 8-bit data. Power supply voltage conversion is implemented by a conversion unit (not shown) for converting a voltage (e.g., 5 V) from the host computer side into 3.3 V.

The display data processed by the input unit 1 is transferred to and stored in the first storage unit 2 via the signal line L1 (step S2). The display data stored in the first storage unit 2 is sequentially transferred to and stored in the second storage unit 3 as a frame memory via the signal line L2 in units of lines under the control of the MPU 5 via the control line L4 (step S3).

The MPU 5 then checks if the display data transferred from the second storage unit 3 to the luminance conversion circuit 4 via the signal line L3 is active data to be displayed on an active window or inactive data (step S4). If it is determined that the display data is active data, the MPU 5 reads out a luminance level value of that display data, and controls to display the display data on the display screen to have a luminance which corresponds to the readout luminance level value (step S5).

On the other hand, if it is determined in step S4 that the display data is inactive data, the MPU 5 reads out the luminance level value of that display data (step S6), and multiplies the readout luminance level value by ½ (step S7). Also, the MPU 5 drops the digits after the decimal point of the value obtained in step S7 (step S8). The flow then advances to step S5, and the display data is displayed on the display screen using the obtained luminance level value.

As described above, according to the first embodiment, even when a plurality of windows (display data) are displayed on a single screen, the active window which is currently being accessed is displayed on the display screen using the luminance level value determined for that window, and each inactive window which is not being accessed is displayed on the display screen using a value obtained by multiplying the predetermined luminance level value for that window by ½. Hence, the user of the display device can adequately recognize the window he or she is currently accessing.

Second Embodiment

The second embodiment of the present invention will be described below with reference to FIGS. 5 and 6.

Figure 5:
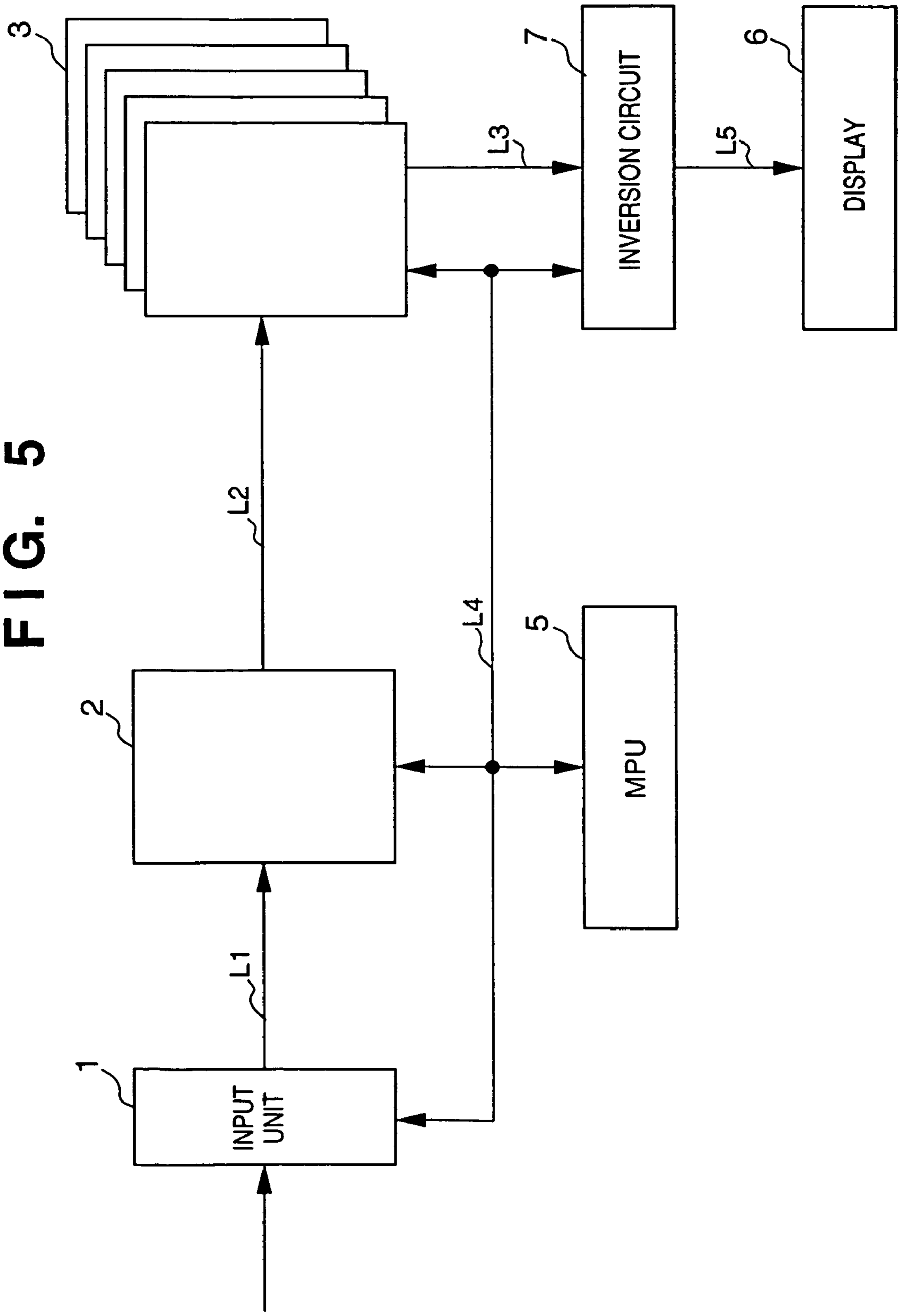
FIG. 5 is a block diagram showing the arrangement of an information processing system according to the second embodiment of the present invention.

FIG. 5 is a block diagram showing the arrangement of an information processing system of the second embodiment.

The second embodiment is different from the first embodiment described in above in that an inversion circuit 7 is used in place of the luminance conversion circuit 4 shown in FIG. 3. Other building components and functions are the same as those shown in FIG. 3 in the first embodiment. The inversion circuit 7 has a function of inverting the luminance level value set for display data to be displayed on an inactive window by the MPU 5.

For example, when display data read out from the second storage unit 3 is 8-bit data and the luminance level value is "64", that luminance level value can be expressed by "01000000" in binary notation. When this value is input to the inversion circuit 7, "64" (decimal notation) is subtracted from "255" (decimal notation). As a result, a value "191" (decimal notation), i.e., "10111111" (binary notation), is obtained. The inversion circuit 7 inverts display data to be displayed on the display screen using the obtained value, and sends it to the display 6.

Figure 6:
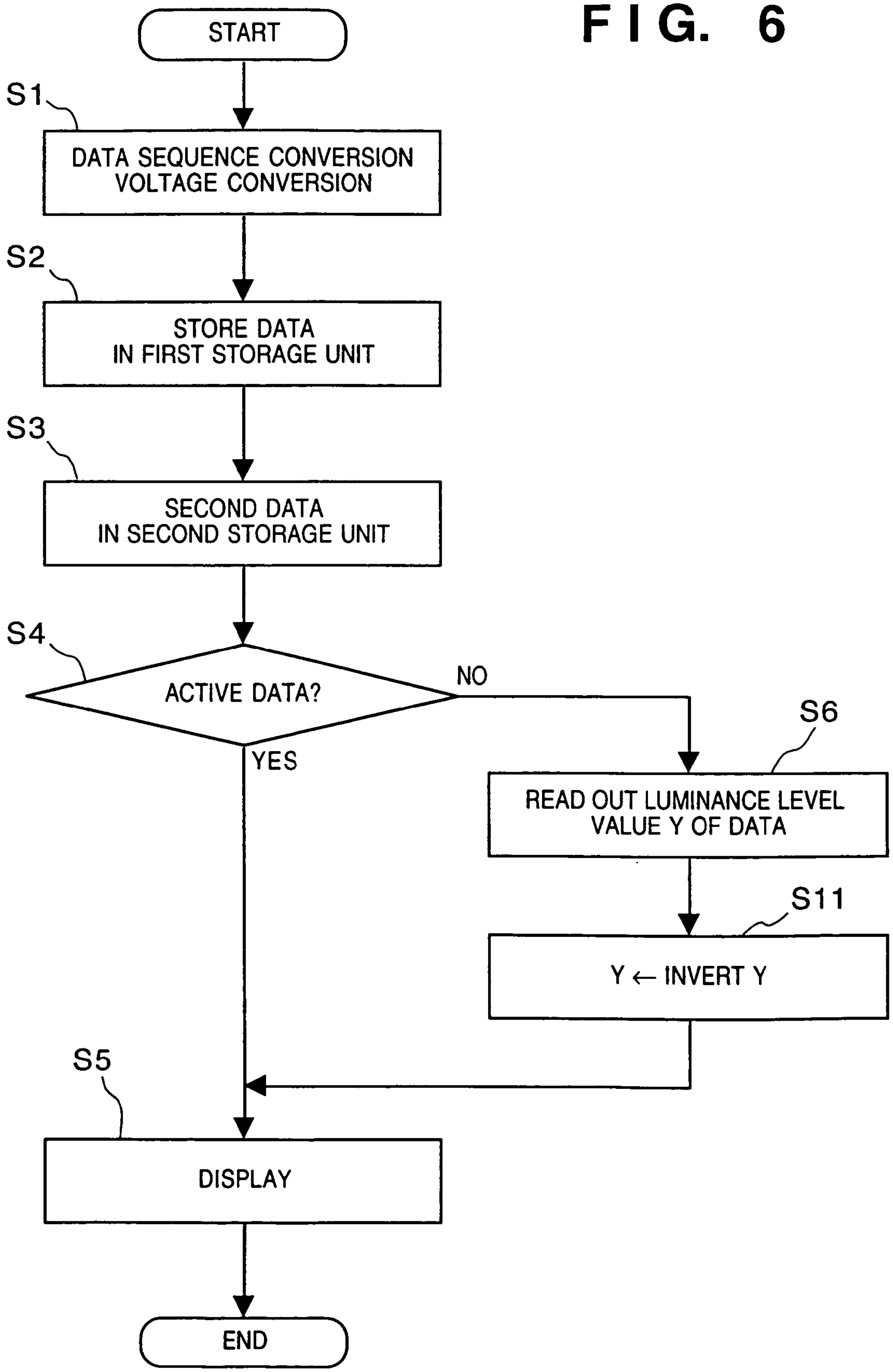
FIG. 6 is a flow chart showing a display control sequence executed in the second embodiment.

FIG. 6 is a flow chart showing the display control sequence executed in the second embodiment.

In FIG. 6, the processes in steps S1 to S5 are the same as those shown in FIG. 4 in the first embodiment.

If the MPU 5 determines that the display data transferred from the second storage unit 3 to the inversion circuit 7 via the signal line L3 is inactive data, it reads out the luminance level value of that display data (step S6). The readout luminance level value is inverted by the aforementioned computation (step S11). The flow then advances to step S5, and the display data is displayed on the display screen using the obtained luminance level value.

As described above, according to the second embodiment, when a plurality of windows (display data) are displayed on a single screen, an active window which is currently being accessed is displayed on the display screen using a luminance level value determined for that window, and inactive windows which are not being accessed are displayed on the display screen using a value obtained by inverting the luminance level value determined for the active window. Hence, the user of the display device can adequately recognize the window he or she is currently accessing.

In the first and second embodiments described above, whether input display data is active or inactive may be determined as follows. For example, a pointing device such as a mouse is adopted, a position pointed by a cursor that moves on the display screen in accordance with operation of the pointing device is detected by the MPU 5, and the window located at the detected position is determined to be active.

Such arrangement can be realized by, e.g., that shown in the block diagram in FIG. 3 of the first embodiment. In this case, display data to be input to the luminance conversion circuit 4 (display data output from the second storage unit 3 via the signal line L3) is monitored by the MPU 5, and if the cursor is present on a window on which the display data transferred from the signal line L3 to the luminance conversion circuit 4 is displayed, it is determined that the display data is active; otherwise, it is determined that the display data is inactive. Such active/inactive determination method may be implemented by the arrangement shown in FIG. 5 in the second embodiment. In this case, the same determination is made for display data to be input to the inversion circuit 7 in place of the luminance conversion circuit 4.

Third Embodiment

Figure 7:
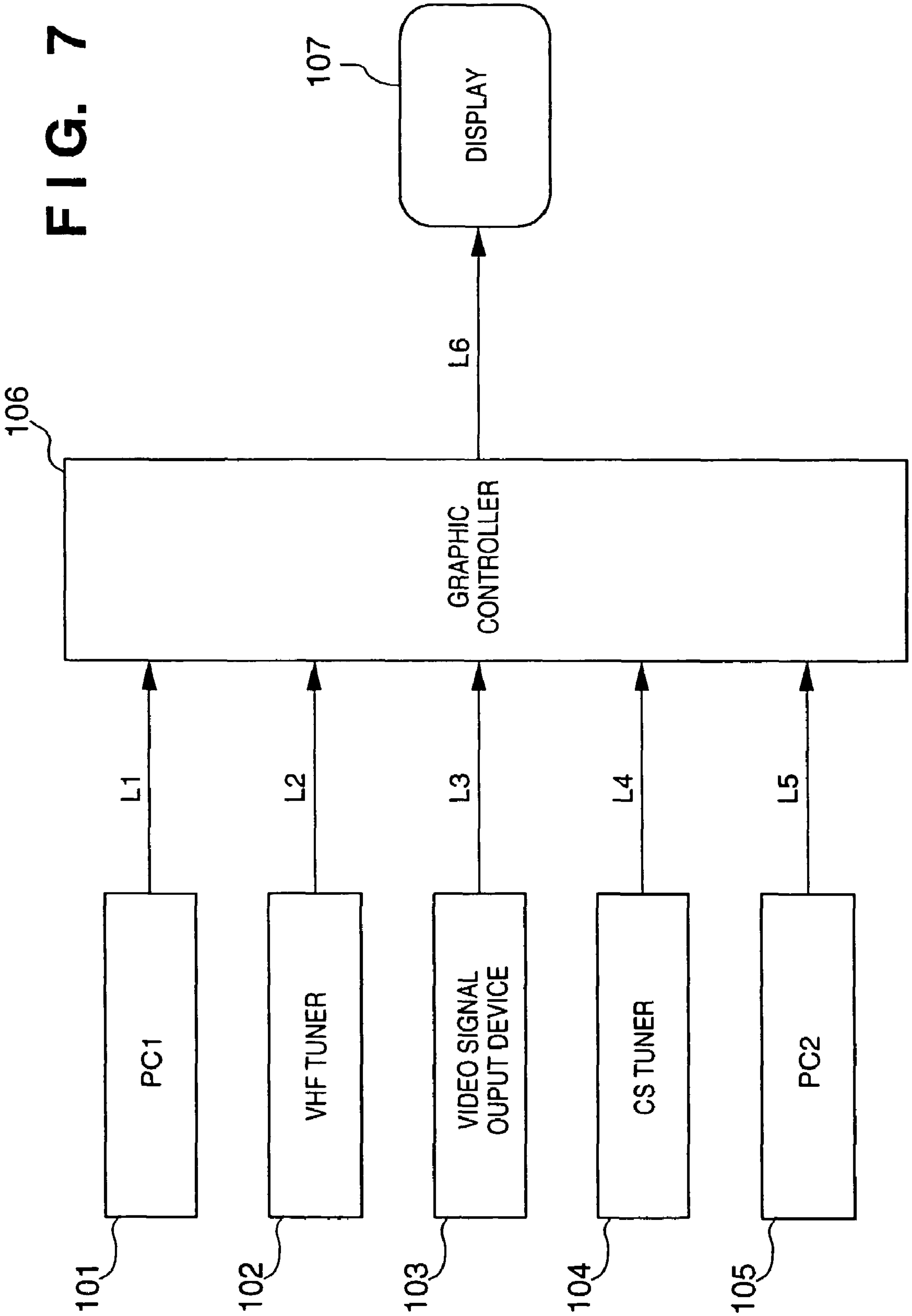
FIG. 7 is a block diagram showing the arrangement of an information processing apparatus according to the third embodiment of the present invention.

FIG. 7 is a block diagram showing the arrangement of an information processing system according to the third embodiment.

Reference numeral 101 denotes a first host computer (PC1) which can output analog data, and incorporates a CPU, RAM, ROM, and the like (none of them are shown). Reference numeral 102 denotes a VHF tuner for receiving a terrestrial broadcast. Reference numeral 103 denotes a video signal output device for outputting a video signal. Reference numeral 104 denotes a CS tuner for receiving an SD (Standard Definition) satellite broadcast. Reference numeral 105 denotes a second host computer (PC2) which can output digital data, and incorporates a CPU, RAM, ROM, and the like (none of them are shown) as in the first host computer 101. Reference numeral 106 denotes a graphic controller for receiving signals from the individual devices connected thereto. Reference numeral 107 denotes a display which comprises a CRT, LCD, or the like, and displays an image on the basis of image data output from the graphic controller 106.

The first host computer 101 is connected to the graphic controller 106 via a signal line L1, and outputs analog data to the graphic controller 106 via the signal line L1. Likewise, the VHF tuner 102, video signal output device 103, CS tuner 104, and second host computer 105 respectively output the received terrestrial broadcast, video signal, received satellite broadcast, and digital data to the graphic controller 106 via signal lines L2, L3, L4, and L5.

The graphic controller 106 processes these plurality of types of input image data to optimal image data, and displays the processed image data on the display 107 via a signal line L6. The display 107 is capable of displaying an image having a resolution of 3,200 dots×2,400 dots or more. The display 107 has, as a display pattern, a multi-window display function, i.e., can select one of a plurality of input data and display the selected data on a full screen, or can select a plurality of data and display them on a plurality of windows such as two or four windows.

For example, only image data from the first host computer 101 can be displayed on the display 107 via the graphic controller 106. Also, the satellite broadcast received by the CS tuner 104 and image data from the first host computer 101 are input to the graphic controller 106, and images corresponding to these image data can be displayed on two windows on the display 107.

The detailed arrangement of the graphic controller 106 of the third embodiment will be described below using FIG. 8.

Figure 8:
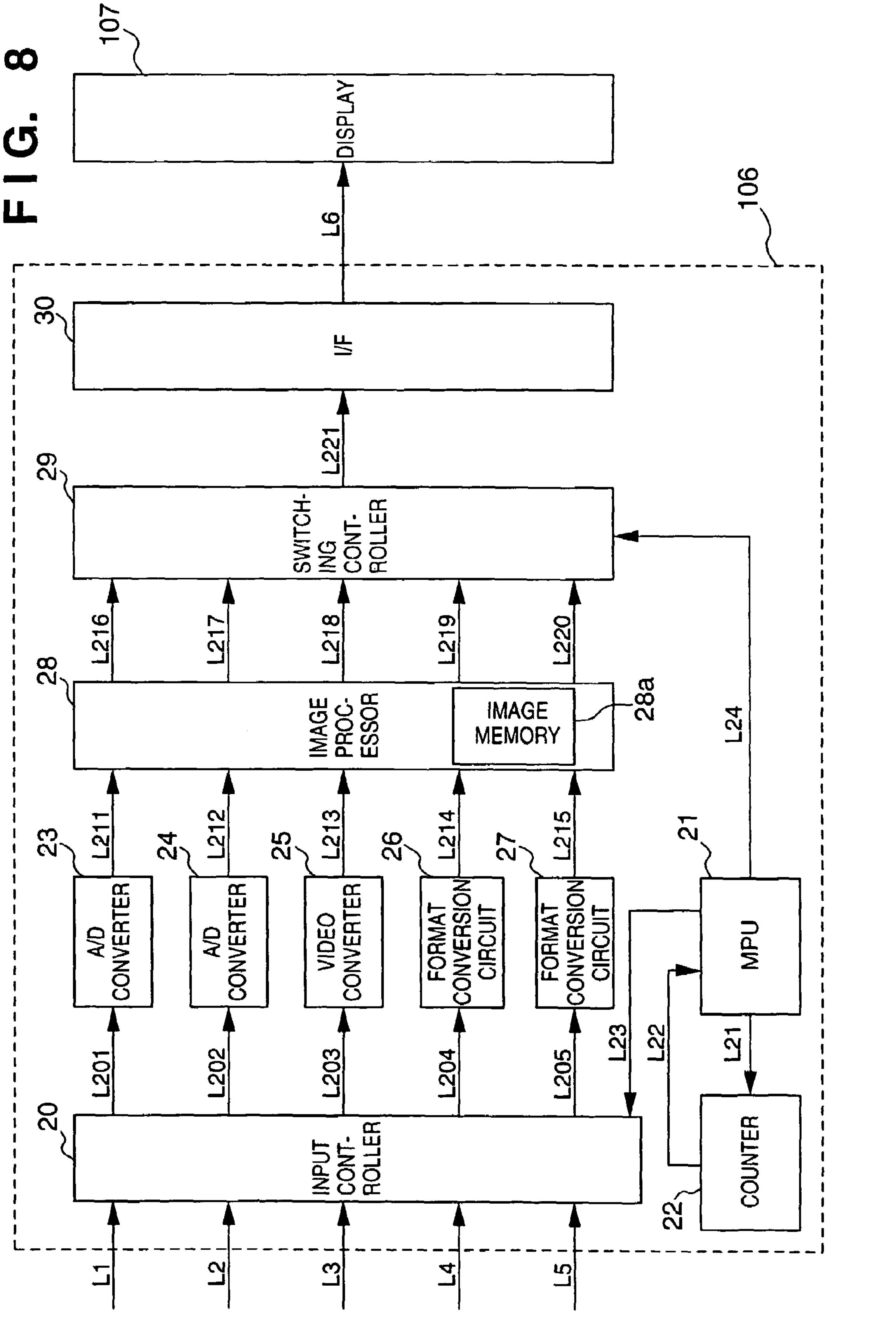
FIG. 8 is a block diagram showing the detailed arrangement of a graphic controller of the third embodiment.

FIG. 8 is a block diagram showing the detailed arrangement of the graphic controller of the third embodiment.

Image data (e.g., analog RGB, resolution=XGA (1,024×768), frequency=65 MHz) output from the first host computer 101 is connected to an input controller 20 via the signal line L1. The input controller 20 also serves as a control circuit for restricting capture of image data and controlling peripheral circuits under the control of a microcomputer (MPU) 21.

If a signal line L21 changes from logic "1" to logic "0" by a control signal from the MPU 21, a down counter 22 decrements a predetermined value (e.g., 1 sec) in unitary decrements, and informs the MPU 21 of a borrow signal via a signal line L22 every time it is generated. In response to this signal, the MPU 21 determines input data to be controlled, and controls the determined data via a signal line L23.

A trigger that directly controls the MPU 21 is input as a command from the second host computer 105 via a signal line (not shown) independently of the signal line L5 in accordance with an instruction from a remote controller.

Image data input to the input controller 20 via the signal line L1 is under the control of the MPU 21. The input controller 20 is comprised of an analog switch or a high-speed switching element, and the like.

Image data that has passed through the input controller 20 is input to an analog-to-digital converter (A/D converter) 23 via a signal line L201. In this case, since the input image data is an analog signal, it is converted into a digital signal. The converted digital signal is connected to an image processor 28 via a signal line L211.

The image processor 28 stores the received digital signal in an image memory 28*a* under the control of the MPU 21 (via a signal line not shown). The stored digital signal undergoes resolution conversion such as upscaling, downscaling, or the like in correspondence with the screen size and display window size of the display 107, and is output to a switching controller 29 via a signal line L216.

Likewise, image data from the VHF tuner 102 is sent to the input controller 20 via the signal line L2, and is output onto a signal line L202 via the input controller 20.

Next, the image data is converted by an analog-to-digital converter (A/D converter) 24 from an analog signal into a digital signal in the same manner as the aforementioned data, and the digital signal is output to the image processor 28 via a signal line L212. The digital signal is stored in the image memory 28*a*, and undergoes resolution conversion as needed. The resolution-converted digital signal is output to the switching controller 29 via a signal line L217 in the same manner as the aforementioned data.

Image data (video signal) from the video signal output device 103 is input to the input controller 20 via the signal line L3, and is output onto a signal line L203 via the input controller 20.

The video signal input to a video decoder 25 via the signal line L203 undergoes format conversion, and is sent to the image processor 28 via a signal line L213. The image processor 28 stores the video signal in the image memory 28*a* in the same manner as the aforementioned data, and executes an image process (e.g., a scaling function such as upscaling, downscaling, or the like) as needed. Then, the video signal is output to the switching controller 29 via a signal line L218.

A satellite broadcast (digital image data) that has undergone a digital signal process in the CS tuner 104 is input to the input controller 20 via the signal line L4, and is output onto a signal line L204 via the input controller 20. The digital image data input to a format conversion circuit 26 undergoes a conversion process since its signal level is digital and LVDS (Low Voltage Differential Signaling). After that, the image data output to the image processor 28 via a signal line L214 is stored in the image memory 28*a*, and undergoes an image process such as resolution conversion or the like as needed. The image data that has undergone the image process is output to the switching controller 29 via a signal line L219.

Image data output from the second host computer 105 is input to the input controller 20 via the signal line L5, and is output onto a signal line L205 via the input controller 20. Note that the signal level on the signal line L205 is TMDS (Transition Minimized Differential Signaling) in this embodiment. This is a digital standard for transferring a digital signal.

The digital image data input to a format conversion circuit 27 via the signal line 205 undergoes a conversion process since its signal level is digital. The image data output to the image processor 28 via the signal line L215 is stored in the image memory 28*a*, and undergoes an image process such as resolution conversion or the like as needed. The image data that has undergone the image process is output to the switching controller 29 via a signal line L220.

In this manner, image data output from the first host computer 101, VHF tuner 102, video signal output device 103, CS tuner 104, and second host computer 105 are connected to the switching controller 29 via the signal lines L1 to L5, input controller 20, and image processor 28.

The switching controller 29 selectively extracts images from the plurality of input image data, and outputs them to an interface circuit (I/F) 30 via a signal line L221. Note that the MPU 21 recognizes a window which is currently being accessed, and its window size and physical position. Hence, the MPU 21 processes the input image data in correspondence with the display format of the display 107 in the interface circuit 30, and displays the data on the display 107 via the signal line L6.

The display screen of the display 107 of the third embodiment will be explained below using FIG. 9.

Figure 9:
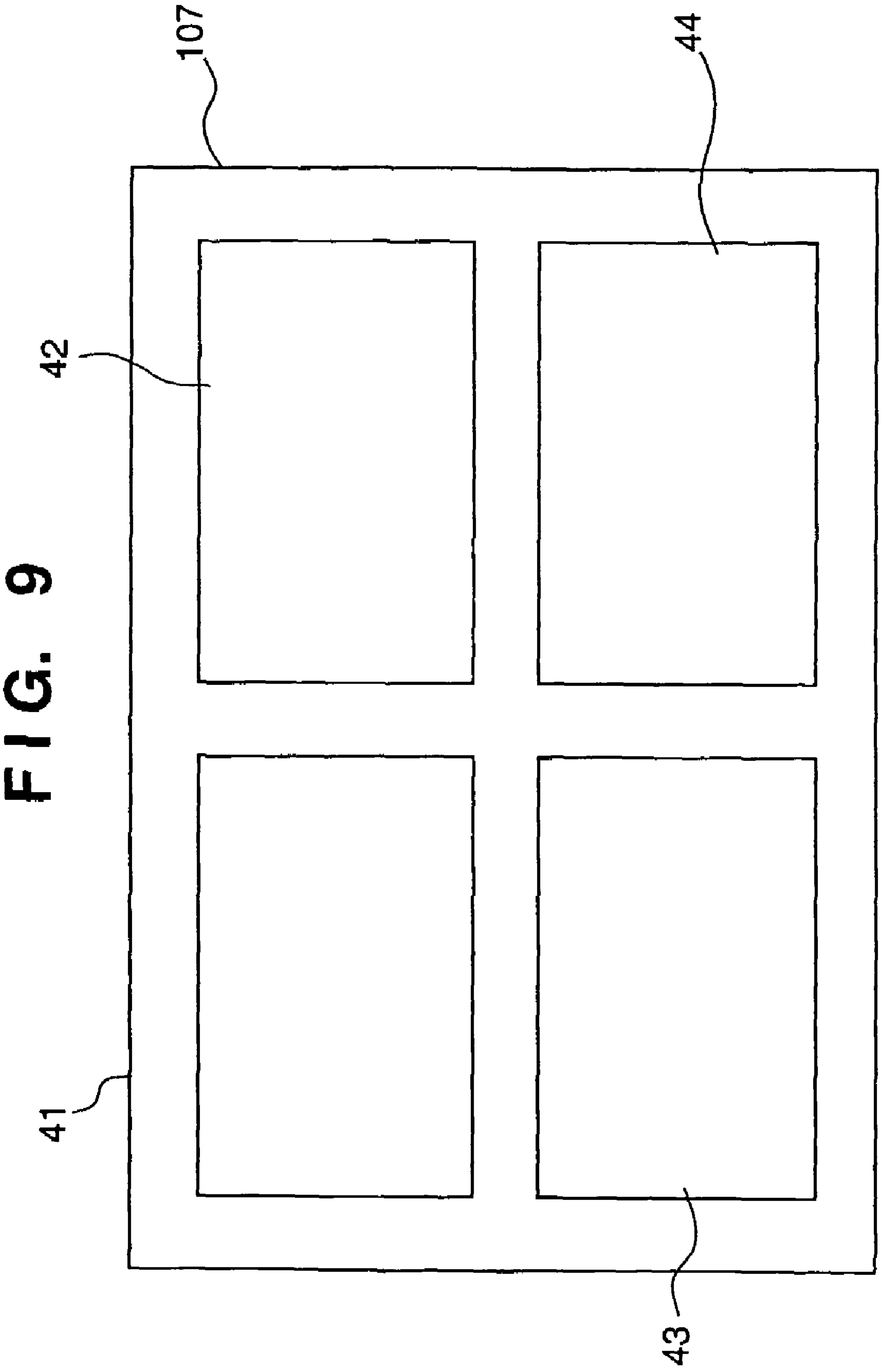
FIG. 9 is a view showing the display screen of a display of the third embodiment.

FIG. 9 shows the display screen of the display of the third embodiment.

In FIG. 9, four windows are displayed on the display 107. For example, a window 41 displays the image output from the host computer 101, a window 42 displays a ground broadcast wave image from the VHF tuner 102, a window 43 displays an image played back by the video signal output device 103, and a window 44 displays a satellite broadcast wave video from the CS tuner 104.

Assume that the viewer selects the window 43 as a window he or she wants to see from the four windows in such display state. More specifically, the window that displays an image played back by the video signal output device 103 is the one he or she wants to review.

Means for selecting a window on the display 107, i.e., means for selecting an active window can easily realize selecting or the like of, e.g., a selection number button, cursor (not shown) on the remote controller.

In response to the selection, the MPU 21 activates the counter 22 via the signal line L21. The counter 22 starts downcounting. An initial value is set in advance (e.g., a numerical value "1 sec" is set).

After that, the counter 22 decrements the initial value in unitary decrements, and when a borrow signal is generated, the counter 22 informs the MPU 21 of that result via the signal line L22. In response to that information, the MPU 21 open/close-controls signal gates on the individual signal lines input to the input controller 20. In this case, since the window 43 is the one the user wants to see, the signal gate on the signal line L3 remains open.

When the counter 22 generates the next borrow signal on the signal line L22 as a decrement result, the input controller 20 opens the closed signal gates to capture images for one frame, and executes a process for capturing image data.

Upon completion of capturing of image data for one frame, the MPU 21 closes the signal gates in the graphic controller 20 via the signal line L23.

In this manner, every time the signal (borrow signal) output from the counter 22 on the signal line L22 changes (1-sec intervals), the gates in the input controller 20 are repeatedly opened/closed (except for the signal gate to which the image data of interest is input).

With this control, image data other than that the user wants to see are sampled, i.e., decimated at given intervals. In this manner, the viewer can visually confirm these input image data as still images although they are actually moving image data.

The processing flow of the process executed in the third embodiment will be explained below using FIG. 10.

Figure 10:
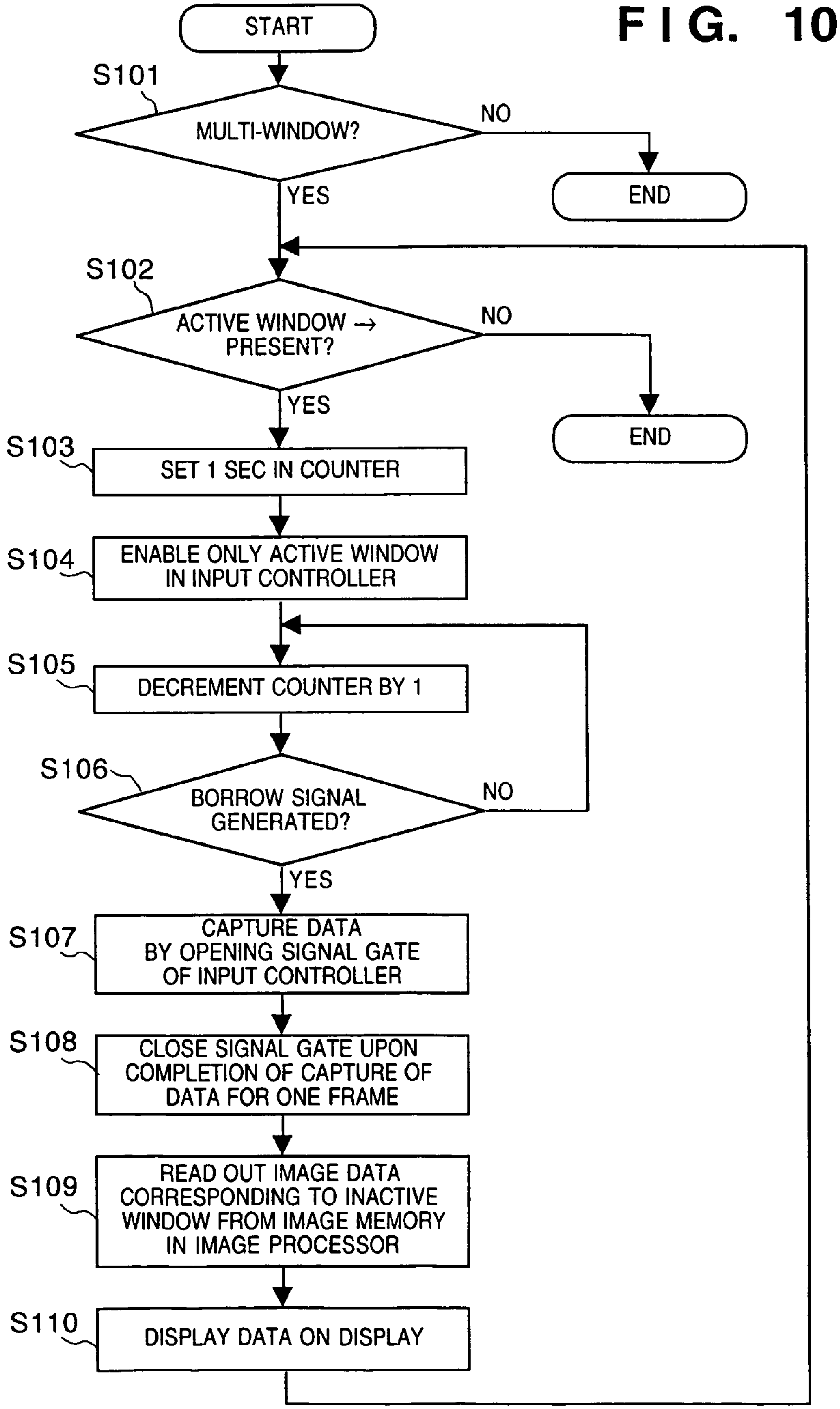
FIG. 10 is a flow chart showing the processing flow of a process executed in the third embodiment.

FIG. 10 is a flow chart showing the processing flow of the process executed in the third embodiment.

Note that FIG. 10 shows the basic processing flow upon implementing the display state shown in FIG. 9 (four-window display).

The MPU 21 checks based on a viewer instruction if the multi-window function is to be activated (step S101). If the multi-window function is not to be executed (NO in step S101), the MPU 21 ends the process. On the other hand, if the multi-window function is to be executed (YES in step S101), the flow advances to step S102.

When the multi-window function is executed, the MPU 21 checks if all the multi-windows are displayed in real time, i.e., the presence/absence of a window to be set active (step S102). If all the multi-windows are displayed in real time, i.e., if there is no window to be set active (NO in step S102), the MPU 21 ends the process. On the other hand, if not all the multi-windows are displayed in real time, i.e., if there is a window to be set active (YES in step S102), the flow advances to step S103.

If there is a window to be set active, the MPU 21 determines which one of the windows is to be activated. The MPU 21 then sets a numerical value in the counter 22. In this case, the MPU 21 sets a binary value corresponding to 1 sec in an internal register of the counter 22 via the signal line L21 (step S103). Once the numerical value is set, it is automatically reloaded in the counter 22 when a borrow signal is generated.

The MPU 21 then controls a gate control circuit in the input controller 20 (step S104). The MPU 21 executes control for enabling only image data, corresponding to the to-be-activated window, of input image data (signal lines L1 to L5) via the signal line L23. With this control, only the active window (e.g., only image data on the signal line L3 is enabled) is displayed in real time on the display 107.

Upon completion of the control, the MPU 21 decrements the counter 22 by 1 (step S105).

The MPU 21 checks if it receives a borrow signal generated by the counter 22 via the signal line L22 (step S106). If no borrow signal is generated yet (NO in step S106), the flow returns to step S105. If a borrow signal is generated (YES in step S106), the flow advances to step S107, and the MPU 21 opens the signal gates of the input controller 20 via the signal line L23 to capture input image data to be displayed on inactive windows (S107).

Upon completion of capture of image data to be displayed on the inactive windows for one frame, the MPU 21 closes the signal gates of the input controller 20 (step S108). Note that the captured image data are stored in the image memory *28a* in the image processor 28.

The MPU 21 sequentially reads out the image data to be displayed on the inactive windows from the image memory *28a* in the image processor 28 (step S109). The MPU 21 displays the readout data on the display 107 (step S110).

As described above, according to the third embodiment, when a plurality of windows are displayed on the single display 107, since images in the inactive windows other than the active window of his or her choice are frame-decimated and displayed, the viewer can look at the active window without being distracted to other unwanted information, and can effectively utilize the multi-window function.

Fourth Embodiment

In the fourth embodiment, a modification of the graphic controller 106 of the third embodiment will be explained. More specifically, in the graphic controller shown in FIG. 8 in the third embodiment, the counter value of the counter 22 is fixed at a predetermined numerical value (1 sec). However, in the fourth embodiment, the viewer can set an arbitrary value in the counter 22.

Figure 11:
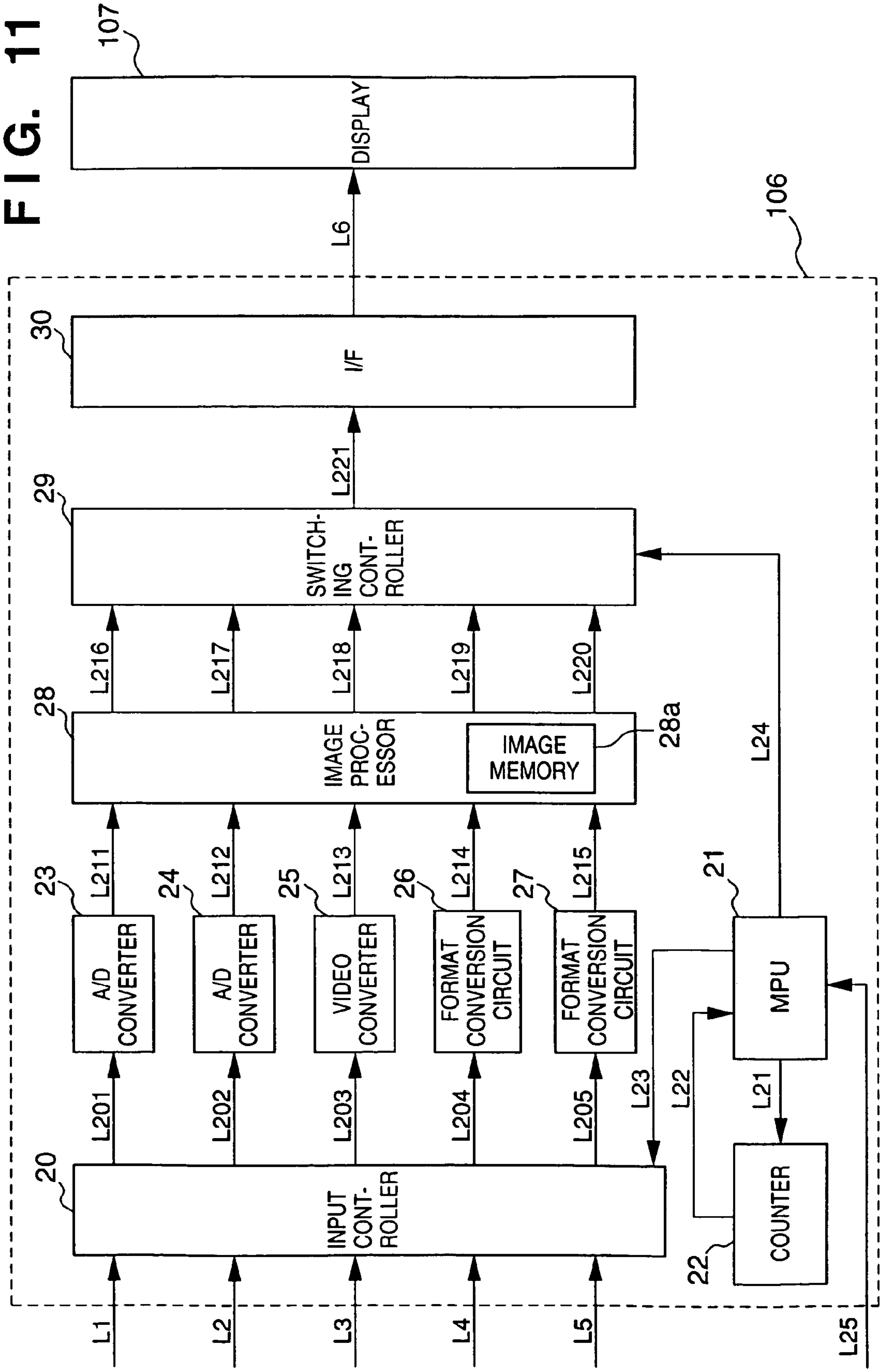
FIG. 11 is a block diagram showing the detailed arrangement of a graphic controller according to the fourth embodiment of the present invention.

FIG. 11 is a block diagram showing the detailed arrangement of the graphic controller of the fourth embodiment.

As shown in FIG. 11, in the fourth embodiment, a signal line L25 that can communicate with the MPU 21 is added. This signal line L25 allows an external device to directly access the MPU 21, and a counter value can be input from a keyboard (not shown) connected to a terminal device, a remote controller (not shown), or the like.

As the input method, counter values to be set are displayed as OSD (on-screen display) on the display 107, and the viewer selects one of them to input an arbitrary counter value. That is, the counter value can be input by the same input method as that for setting the volume, color tone, luminance, contrast, and the like on a normal television.

The counter value set by the viewer is sent to the MPU 21 as a command via the signal line L25. Upon receiving this command, the MPU 21 sets the arbitrary counter value in the internal register (not shown) of the counter 22 via the signal line L21.

As described above, according to the fourth embodiment, since the frame decimation time of images in the inactive windows other than the active window the viewer would like to see can be arbitrarily changed, he or she can select an arbitrary frame decimation time according to the intended purpose, and can effectively use the multi-window function.

Fifth Embodiment

In the above embodiments, four windows are opened on the display 107, only the active window the viewer wants to see is displayed in real time, and the remaining inactive windows are frame-decimated to display still images even though they are actually moving images.

However, the present invention can select not only one window to be set active but also an arbitrary number of windows to be set active, like two or three windows. More specifically, windows to be displayed on the display 107 in real time and those to be frame-decimated can be arbitrarily selected.

Sixth Embodiment

In the third to fifth embodiments, images in the inactive windows other than the active window are frame-decimated and displayed to easily direct viewer's attention to the active window of his or her choice. The sixth embodiment will explain an arrangement for directing viewer's attention to the active window of his or her choice more easily by controlling the luminance levels of images in the inactive windows other than the active window in addition to the arrangement described in the third embodiment.

More specifically, in the sixth embodiment, images to be displayed in inactive ones of the four windows displayed on the display screen in FIG. 2 in the first embodiment described above are frame-decimated in addition to setting lower luminance than the image in the active window.

The detailed arrangement of the graphic controller 106 of the sixth embodiment will be explained below using FIG. 12.

Figure 12:
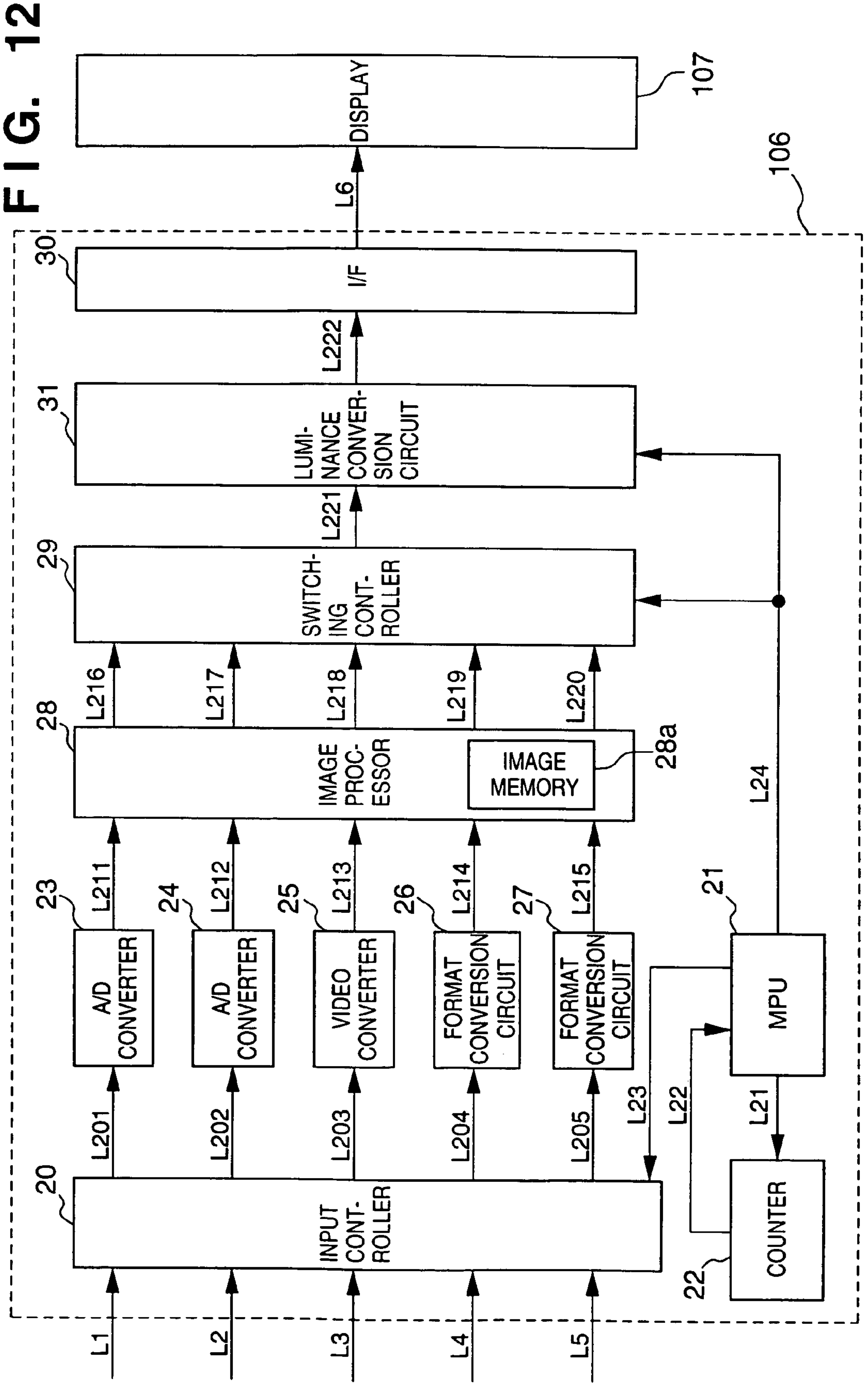
FIG. 12 is a block diagram showing the detailed arrangement of a graphic controller according to the sixth embodiment of the present invention.

FIG. 12 is a block diagram showing the detailed arrangement of the graphic controller of the sixth embodiment.

Note that the same reference numerals denote the same building components as those in the detailed arrangement of the graphic controller 106 shown in FIG. 8 in the third embodiment, and a detailed description thereof will be omitted.

Referring to FIG. 12, the switching controller 29 is controlled by a control signal sent from the MPU 21 via a signal line L24, and outputs image data to a luminance conversion circuit 31 via the signal line L221.

The MPU 21 recognizes a window which is currently being accessed, and its window size and physical position. Hence, the MPU 21 checks based on the physical position information of the window if image data which is currently processed by the luminance conversion circuit 31 corresponds to an active window. If the image data corresponds to an inactive window, the MPU 21 lowers its luminance level. For example, when the input image data has a luminance level value=64, and corresponds to an inactive window, the luminance conversion circuit 31 controls the luminance level value of that display data to be 32. In this manner, the image data to be displayed on the display 107 is luminance-converted, and is displayed on the display 107 via the signal line L6. Note that the luminance level value of image data is pre-stored in, e.g., the image memory 28*a*.

The processing flow of the process executed in the sixth embodiment will be explained below using FIG. 13.

Figure 13:
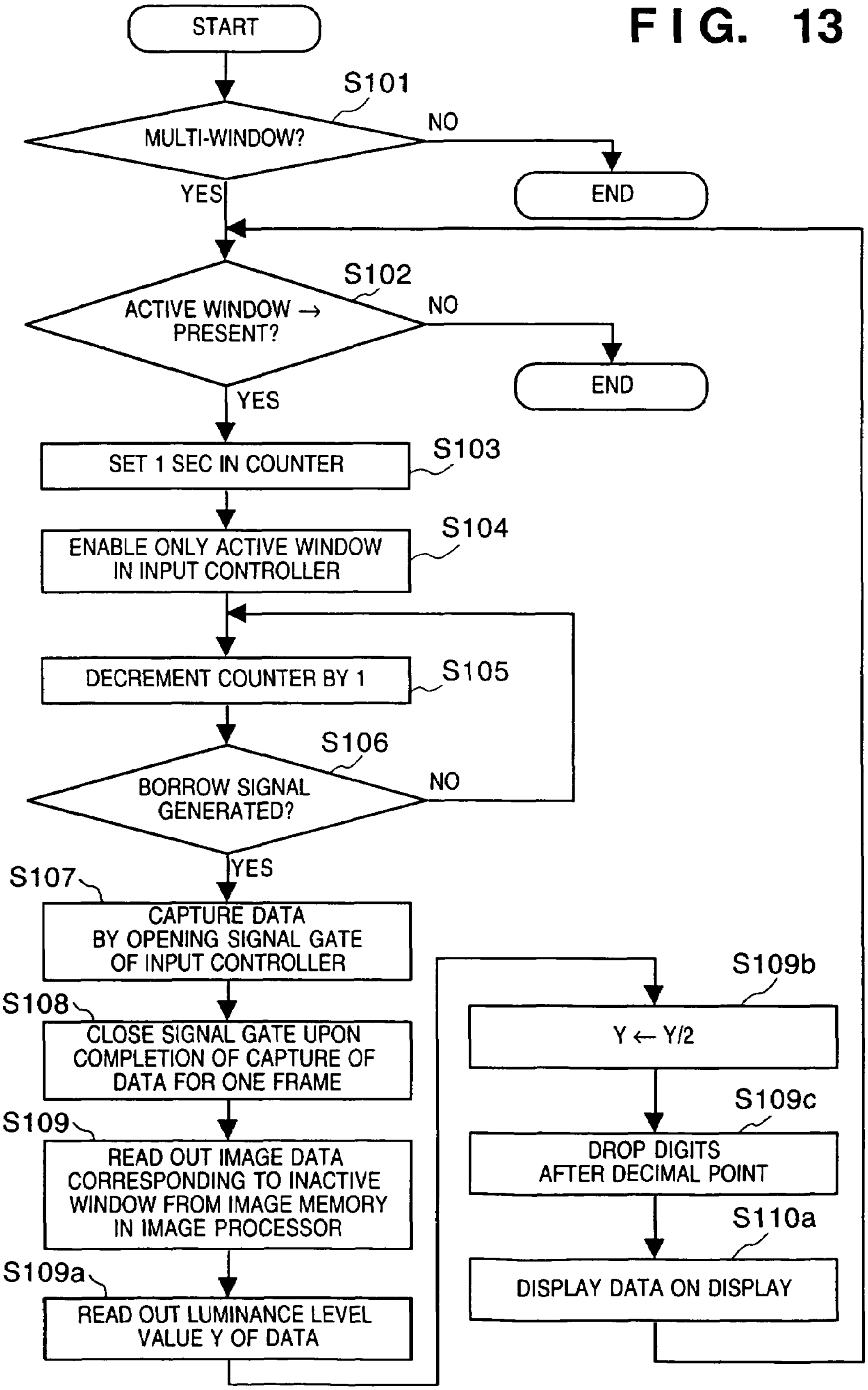
FIG. 13 is a flow chart showing the processing flow of a process executed in the sixth embodiment.

FIG. 13 is a flow chart showing the processing flow of the process executed in the sixth embodiment.

Note that the same step numbers denote the same processes as those in the flow chart in FIG. 10 in the third embodiment, and a detailed description thereof will be omitted.

After the process in step S109, the MPU 21 reads out the luminance level value of image data (step S109*a*). The MPU 21 multiples the readout luminance level value by ½ (step S109*b*). The MPU 21 drops the digits after the decimal point of the obtained value (step S109*c*). The MPU 21 sequentially reads out image data to be displayed on an inactive window using the obtained luminance level value from the image memory 28*a* in the image processor 28, and displays that data on the display 107 (step S110*a*).

As described above, according to the sixth embodiment, when a plurality of windows are displayed on the single display 107, an image in an active window is displayed using the luminance level value determined for that window, and an image in each inactive window is displayed by multiplying the luminance level value determined for that window by ½ and frame-decimating data. Hence, the viewer of the display device can adequately recognize the window he or she is currently accessing.

Note that the present invention can be applied to even an information processing system which is either one of a standalone apparatus, a display system consisting of a plurality of devices, or a display system that executes processes via a network such as a LAN or the like, as long as the function of the present invention is implemented.

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the flow charts shown in FIGS. 4, 6, 10, and 13 described above.

As many apparently widely different embodiments of the present invention can be made without departing from the spirit and scope thereof, it is to be understood that the invention is not limited to the specific embodiments thereof except as defined in the appended claims.

What is claimed is:

1. A display device capable of displaying first and second windows on a display screen, comprising:

first receiving means for receiving first image data for displaying a moving image;

second receiving means for receiving second image data for displaying a second image;

image processing means for executing resolution conversion for the first and second image data in correspondence with sizes of the first and the second windows;

storing means for, in a state that the second window is an active window, storing third image data for displaying only selected frames which are part of frames of said moving image, wherein data of the first image data corresponding to unselected frames of the moving image are decimated; and displaying means for displaying the second window on which the second image is formed and for displaying the first window on which the selected frames are formed, wherein the unselected frames are not formed on the first window.

2. The device according to claim 1, further comprising display control means for displaying image data to be displayed on an active window at a higher luminance than a luminance of image data to be displayed on an inactive window.

3. An information processing apparatus capable of displaying first and second windows on a display screen, comprising:

first output means for sequentially outputting first image data;

second output means for sequentially outputting second image data;

first receiving means for receiving the first image data for displaying a moving image;

second receiving means for the second image data for displaying a second image;

image processing means for executing resolution conversion for the first and second image data in correspondence with sizes of the first and the second windows;

storing means for, in a state that the second window is an active window, storing third image data for displaying only selected frames which are part of frames of said moving image, wherein data of the first image data corresponding to unselected frames of the moving image are decimated; and displaying means for displaying the second window on which the second image is formed and for displaying the first window on which the selected frames are formed, wherein the unselected frames are not formed on the first window.

4. The apparatus according to claim 3, further comprising display control means for displaying image data to be displayed on an active window at a higher luminance than a luminance of image data to be displayed on an inactive window.

5. A display control method for a display device capable of displaying first and second windows on a display screen, the method comprising the steps of:

first receiving first image data for displaying a moving image;

secondly receiving second image data for displaying a second image;

executing resolution conversion for the first and second image data in correspondence with sizes of the first and the second windows;

in a state that the second window is an active window, storing third image data for displaying only selected frames which are part of frames of the moving image, wherein data of the first image data corresponding to unselected frames of the moving image are decimated; and displaying the second window on which the second image is formed and display the first window on which the selected frames are formed, wherein the unselected frames are not formed on the first window.

6. A method according to claim 5, wherein the image data is displayed on an active window at a higher luminance than a luminance of image data displayed on an inactive window.

7. A storage medium for storing a program that pertains to display control in a format readable by a computer which is connected to or incorporates a display device capable of displaying first and second windows on a display screen, said program performing the steps of:

first receiving first image data for displaying a moving image;

secondly receiving second image data for displaying a second image;

executing resolution conversion for the first and second image data in correspondence with sizes of the first and the second windows;

in a state that the second window is an active window, storing third image data for displaying only selected frames which are part of frames of the moving image, wherein data of the first image data corresponding to unselected frames of the moving image are decimated; and displaying the second window on which the second image is formed and displaying the first window on which the selected frames are formed, wherein the unselected frames are not formed on the first window.

8. The medium according to claim 7, wherein the image data is displayed on an active window at a higher luminance than a luminance of image data displayed on an inactive window.

9. The device according to claim 1, wherein the second image is a moving image.

10. The apparatus according to claim 3, wherein the second image is a moving image.

11. The method according to claim 5, wherein the second image is a moving image.

12. The medium according to claim 7, wherein the second image is a moving image.

* * * * *

UNITED STATES PATENT AND TRADEMARK OFFICE

CERTIFICATE OF CORRECTION

PATENT NO. : 7,051,287 B1 
APPLICATION NO. : 09/459644
DATED : May 23, 2006
INVENTOR(S) : Takashi Tsunoda It is certified that error appears in the above-identified patent and that said Letters Patent is hereby corrected as shown below:

COLUMN 13:

Line 65, "multiples" should read --multiplies--.

COLUMN 16:

Line 11, "display" should read --displaying--.

Signed and Sealed this

Twenty-seventh Day of November, 2007

JON W. DUDAS
*Director of the United States Patent and Trademark Office*